United States Patent
D'Amico et al.

(10) Patent No.: US 7,593,376 B2
(45) Date of Patent: Sep. 22, 2009

(54) METHOD AND APPARATUS FOR BROADCAST IN AN AD HOC NETWORK USING ELECTED BROADCAST RELAY NODES

(75) Inventors: Thomas V. D'Amico, Inverness, IL (US); Jeffrey D. Bonta, Arlington Heights, IL (US); Randy L. Ekl, Lake Zurich, IL (US); Avinash Joshi, Orlando, FL (US); Michael D. Kotzin, Buffalo Grove, IL (US); Surender Kumar, Naperville, IL (US); Whay Chiou Lee, Cambridge, MA (US); Peggy K. Matson, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 638 days.

(21) Appl. No.: 11/295,909

(22) Filed: Dec. 7, 2005

(65) Prior Publication Data

US 2007/0127421 A1 Jun. 7, 2007

(51) Int. Cl.
*H04W 4/00* (2009.01)
(52) U.S. Cl. .............. 370/338; 455/445; 455/412.2; 455/420; 455/425
(58) Field of Classification Search ............. 370/338; 455/445, 412.2, 420, 425
See application file for complete search history.

(56) References Cited

U.S. PATENT DOCUMENTS

2004/0174844 A1* 9/2004 Cho et al. .................. 370/328

| | | | |
|---|---|---|---|
| 2006/0045065 A1* | 3/2006 | Kim et al. | 370/351 |
| 2007/0121521 A1* | 5/2007 | D'Amico et al. | 370/252 |
| 2007/0280172 A1* | 12/2007 | Tan et al. | 370/335 |
| 2008/0037560 A1* | 2/2008 | Jia et al. | 370/400 |
| 2008/0188177 A1* | 8/2008 | Tan et al. | 455/11.1 |

OTHER PUBLICATIONS

Optimized Link State Routing Protocol For Ad Hoc Networks by P. Jacquet, et al-IEEE-pp. 62-68-2001-Hipercom Project, France.

* cited by examiner

*Primary Examiner*—Joseph H Feild
*Assistant Examiner*—Huy D Nguyen
(74) *Attorney, Agent, or Firm*—Randi L. Karpinia; Anthony P. Curtis

(57) ABSTRACT

A method and apparatus for electing broadcast relay nodes (520B, H, M) in an ad hoc network (500). Each node (520A-520O) generates an attribute message including associated parameters. Each node (520A-520O) generates a weighted value (WV) based on the parameters. The WV can be included in the attribute message for that node, can provide a metric for ranking that node to be nominated to be a broadcast relay node, can alternatively provide a probability measure for that node to probabilistically elect itself as a broadcast relay node. The broadcast manager node (520C) receives the attribute messages and elects at least one nominated node as a broadcast relay node (520B, H, M) based on the attribute messages. Each node (520A-520O) can also initiate election of an intermediate broadcast relay node if that node fails to receive a test message within a predetermined time.

21 Claims, 8 Drawing Sheets

740

742
EACH NODE DECIDING TO NOMINATE ITSELF AS A CANDIDATE NODE TRANSMITS/BROADCASTS AN ATTRIBUTE MESSAGE INCLUDING A WEIGHTED VALUE (WV)

744
EACH NODE OR GROUP OF NODES NOMINATES NOMINEE NODE(S)

746
DESIGNATED BROADCAST MANAGER NODE ELECTS RELAY NODES BASED ON PARAMETERS OF EACH CANDIDATE OR NOMINEE NODE

748
DESIGNATED BROADCAST MANAGER NODE TRANSMITS MESSAGE TO ELECTED RELAY NODES INDICATING THEIR STATUS AS RELAY NODES

749
ELECTED RELAY NODES TRANSMIT ANNOUNCEMENT MESSAGE TO OTHER NODES INDICATING THEIR STATUS AS RELAY NODES

*FIG. 7*

METHOD AND APPARATUS FOR BROADCAST IN AN AD HOC NETWORK USING ELECTED BROADCAST RELAY NODES

FIELD OF THE INVENTION

The present invention relates generally to wireless communications and more particularly to mobile ad hoc networks.

BACKGROUND

Wireless networks have experienced increased development in the past decade. Two types of wireless networks are infrastructure-based wireless networks, and ad hoc wireless networks.

An infrastructure-based wireless network typically includes a communication network with fixed and wired gateways. Many infrastructure-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, such as cellular networks or satellite networks, ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Ad hoc networks can also be self-healing. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of the nodes is that their transmission range is usually relatively limited in comparison to cellular networks. Each node can typically directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("hop-by-hop") until the packets reach the destination node. Each intermediate node acts as a router which can intelligently route the packets (e.g., data and control information) to another node until the packets eventually reach their final destination. To assist with relaying of packets, each node may maintain routes or routing information to other nodes in the network and can utilize routing techniques to adapt to changes in the interconnectivity between nodes. The nodes can maintain this routing information by performing periodic link and topology updates. Alternatively, nodes may discover routing information only when needed, instead of utilizing updates to maintain routes.

Broadcasting in an ad hoc network relies on nodes to repeat a broadcast until all nodes have received the broadcast message. To avoid excessive broadcast traffic, each node receiving a broadcast message determines if it should rebroadcast the message. For example, a message received more than once by a node should not be rebroadcast by the node.

Notwithstanding these advances, it would be desirable to provide broadcast protocols for use in ad hoc networks which exhibit improved broadcast efficiency. It would also be desirable to minimize the number of broadcast messages while also ensuring reliable broadcast (e.g., every node will receive each broadcast message). For example, it would be desirable to provide techniques which can make the transmission more orderly and thereby reduce the number of redundant broadcast packets a given node receives. It would also be desirable to provide techniques that can reduce the likelihood of broadcast packet collisions.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 7 is a flowchart showing an exemplary method for initially electing relay nodes in an ad hoc network which helps ensure election of the most desirable node(s) as relay node(s) in accordance with some embodiments of the invention.

Figure 1:
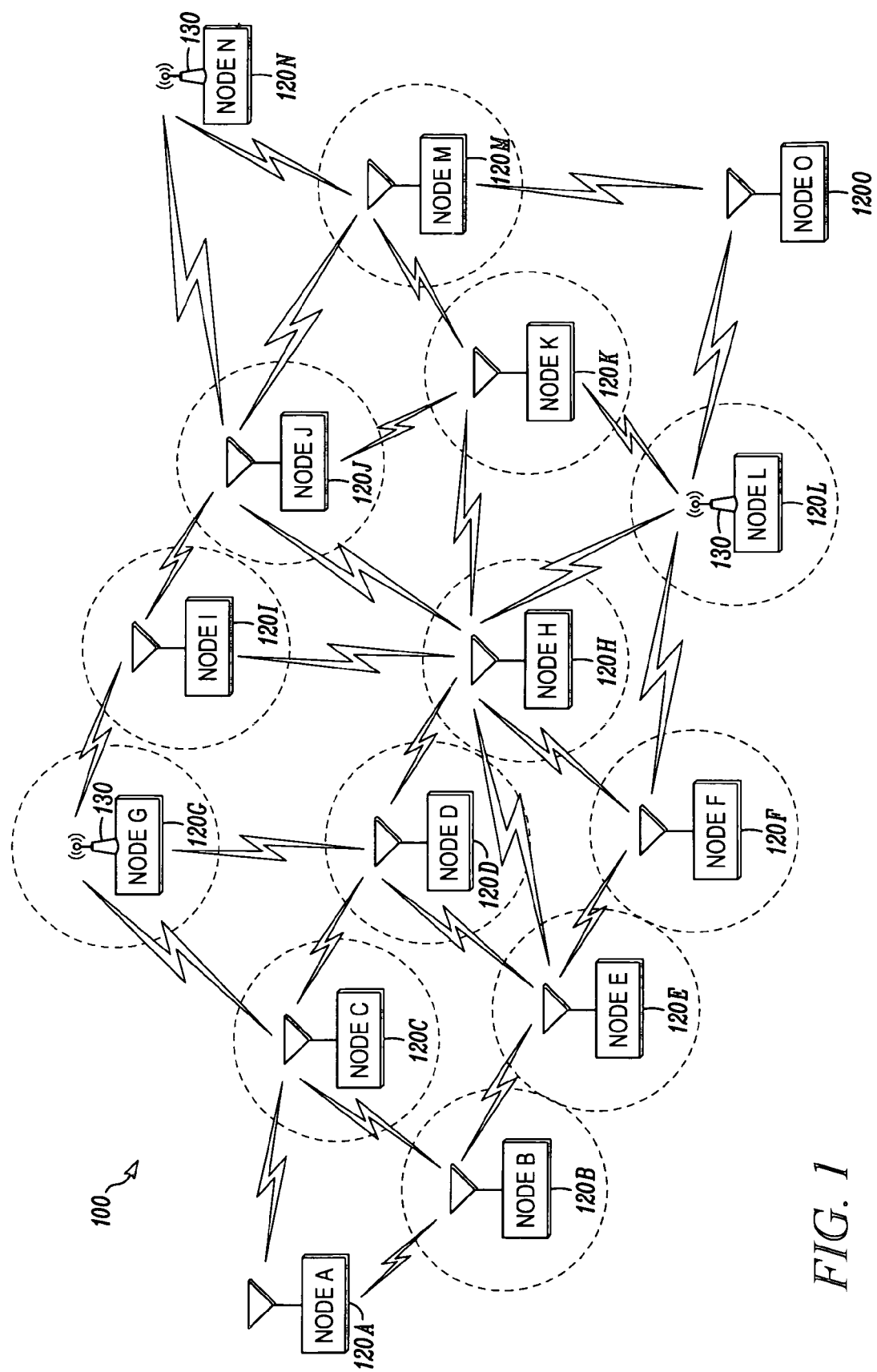
FIG. 1 is a block diagram of an exemplary ad hoc communication network which illustrates a "flooding" approach for broadcasting a broadcast packet from node A to other nodes in the ad hoc network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to the election of relay nodes in an ad hoc network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for electing relay nodes described herein. The non-processor circuits may include, but are not limited to, a radio receiver, a radio transmitter, signal drivers, clock circuits, power source circuits, and user input devices. As such, these functions may be interpreted as steps of a method for electing relay nodes. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

FIG. 1 is a block diagram of an ad hoc communication network 100 operating in an infrastructure mode in which a wireless network is created between a plurality of nodes 120A-120O each having wireless repeater and routing capability, and in which three of the nodes 120G, 120L, and 120N are wired Access Points (APs) 130. The ad hoc communication network 100 can implement routing intelligence, which is typically distributed among nodes 120A-120O, that can help eliminate bottlenecks and improve overall network performance. If access to a wired network is desired, nodes 120A-120O can hop to an AP (typically to the AP that is closest, but to an alternate AP if their current AP is congested or fails).

It should be appreciated that while the ad hoc network 100 in FIG. 1 is shown as operating with wired APs, the ad hoc network 100 of FIG. 1 does not require any wired network to be present. Rather, the nodes 120A-120O can support peer-to-peer communication without the need for wired infrastructure or other networks.

In the ad hoc network 100, communications to or from nodes 120A-120O can "hop" through each other to reach other nodes 120A-120O in the network. The nodes 120A-120O are wireless devices capable of receiving packetized audio, video and/or data information. Some of the components in an exemplary node, such as an appropriate processor, transmitter, receiver and antenna, are described below. The nodes 120A-120O can communicate information packets over wireless carrier frequencies, each of which includes one or more wireless communication channels depending on the multiple access scheme utilized in the network 100.

The access points 130 are typically coupled to a wired network (not shown) and can provide one or more sources of audio, video and/or data information. The access points 130 may be a cellular base station, a wireless access point that complies with the IEEE 802.11 Standard or other wireless local area network (WLAN) Standards, or may also be a Bluetooth access point, or the like. Although not shown in FIG. 1, it should be appreciated that the nodes 120A-120O, can also communicate information packets with a cellular-based network (not shown) over wireless carrier frequencies, each of which includes one or more wireless communication channels depending on the multiple access scheme utilized in the cellular-based network. Examples of multiple access schemes which can be used in the network can include any one or more of time division multiple access (TDMA), direct sequence or frequency hopping code division multiple access (CDMA), frequency division multiple access (FDMA), orthogonal frequency division multiplexing (OFDM), opportunity driven multiple access (ODMA), a combination of any of the foregoing multiple access technologies, a multiple access technology in which portions of the frequency spectrum to be used are determined by local signal quality measurements and in which multiple portions of the frequency spectrum may be used simultaneously, or any other multiple access or multiplexing methodology or combination thereof.

One approach to transmitting broadcast messages in an ad hoc network is known as "flooding." FIG. 1 illustrates a "flooding" approach for broadcasting a broadcast packet from node A 120A to other nodes 120B-120O in the ad hoc network. Each node 102A-120O can advertise its presence by periodically broadcasting an advertisement or "hello" message. In response to the "hello" message, other nodes within range can acknowledge their presence by identifying themselves. In turn, each node can identify its neighbor nodes, and maintain a neighbor list of nodes in proximity to that node. As used herein, a "neighbor node" is a node which is one hop away from the node such that the nodes may communicate with each other. A particular node's neighbor list changes dynamically as the topology of the network changes. At the particular instant in time shown in FIG. 1, node D 120D has four neighbor nodes—node C 120C, node E 120E, node G 120G, and node H 120H.

According to this "flooding" approach, each node initially receiving the broadcast packet from node A 120A acts as a "repeater" node (indicated by the dash circle) that transmits the broadcast packet to all of its neighbor nodes. A broadcast packet typically has a "time to live" that limits the number of re-broadcasts that can be performed. A broadcast packet may also contain a destination address representing a particular node that the packet is intended for. The process of repeating or re-broadcasting continues until all nodes have received the broadcast packet or until the "time to live" is reached or until the destination node has received the broadcast packet. For example, when a node B 120B receives a packet, node B 120B determines whether the received packet is a broadcast packet. If the received packet is a unicast packet, then node B 120B transmits the packet to the neighboring node it is addressed to or intended for. If the received packet is a broadcast packet, then node B 120B transmits (the received broadcast packet to each of its neighbor nodes provided that it is not the intended destination or that the "time to live" counter has not been reached. In this exemplary topology, node B 120B transmits the broadcast packet received from node A 120A to its neighbor nodes, Node C 120C and Node E 120E. At the same time, node C 120C transmits the broadcast packet received from node A 120A to its neighbor nodes Node B 120B, Node D 120D, and Node G 120G. To continue propagating the broadcast packet through the network 110, Node D 120D, Node E 120E and Node G 120G (e.g., the nodes receiving the broadcast packet from the repeater nodes Node B 120B, Node C 120C), then serve as a repeater node (indicated by the dash circle) that transmits the broadcast packet to all of its neighbor nodes. For example, Node D 120D would transmit the broadcast packet to each of its four neighbor nodes—node C 120C, node E 120E, node G 120G, and node H 120H. Thus, broadcast packet transmission via flooding can potentially raise the reliability of transmission since the probability of receiving the broadcast packet from at least one node tends to be relatively high.

However, in many network topologies, the same node is likely to receive the same broadcast packet more than once. For example, after initially receiving the broadcast packet from node A 120A, node C 120C may receive it also from node B 120B. Thus, using the flooding approach to broadcast packets can generate excessive amounts of system traffic which can unnecessarily consume bandwidth since the same data may be redundantly received. This approach can also increase the probability of channel congestion, overload and/or interference in the ad hoc network since each node transmits the broadcast packet to its neighbor nodes upon receipt, except the neighbor node from which the broadcast packet was received. As a result, the likelihood of packet collisions increases since some nodes overlap but do not have mechanisms (e.g., centralized controller) for adjusting the timing in overlapping transmission areas. In addition, signaling messages greatly increase since every node rebroadcasts each broadcast packet to all its neighbor nodes, except the one from which the broadcast packet was received. In this regard, flooding methods are not scalable.

Figure 2:
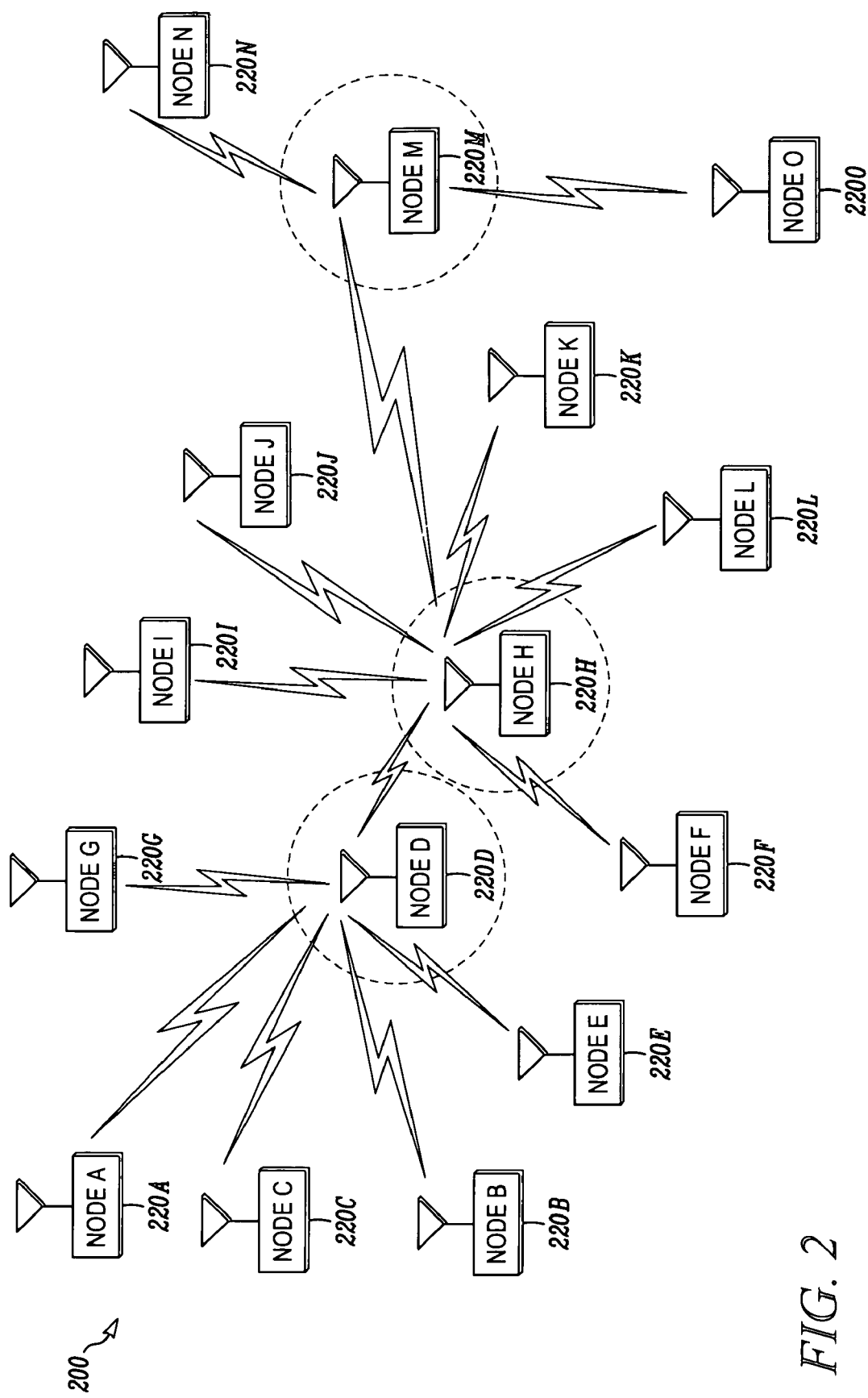
FIG. 2 is a block diagram of an exemplary peer-to-peer ad hoc communication network which illustrates a "relay" approach for broadcasting a broadcast packet throughout the network.

FIG. 2 is a block diagram of an exemplary peer-to-peer ad hoc communication network 200 which illustrates a "relay" approach for broadcasting a broadcast packet throughout the network. In FIG. 2, the broadcast packet originates at node A 220A and is relayed to other nodes 220B-220O in the network 200.

According to a relay node approach, a relay node or nodes can be designated or selected as "relay nodes" to receive and transmit (or "relay") broadcast packets throughout the ad hoc network. In this example, it is assumed that node A 220A transmits a broadcast packet and that nodes designated by a dashed-line circle (e.g., node D 220D, node H 220H, and node M 220M) have been designated or selected as "relay" nodes. The nodes 220B, 220C, 220E, 220G, 220F, 220I, 220J, 220K, 220L, 220N, and 220O serve as receiver nodes.

When node A 220A broadcasts a broadcast packet, each node receives the packet and determines whether the received packet is a broadcast packet. If the received packet is a unicast packet (as opposed to a broadcast packet), the node transmits the received unicast packet to its appropriate neighbor node toward the destination. If the received packet is a broadcast packet, then node determines whether or not the node itself has been designated or selected as a relay node. If the node is not a relay node, the node does not transmit the received packet to any other nodes. However, if the node is a relay node, then it transmits the received broadcast packet to each of its neighbor nodes. For instance, in FIG. 2 the relay nodes 220D, 220H, 220M can then relay the broadcast packet to their respective neighbor nodes 220B, 220C, 220E, 220G, 220F, 220H, 220I, 220J, 220K, 220L, 220M, 220N, 220O. Specifically, relay node 220D can relay the broadcast packet to its neighbor nodes 220B, 220C, 220E, 220G, and 220H, relay node 220H can relay the broadcast packet to its neighbor nodes 220F, 220I, 220J, 220K, 220L, and 220M, and relay node 220M can relay the broadcast packet to its neighbor nodes 220N, 220O. In comparison to the flooding approach described with reference to FIG. 1, the number of redundant transmissions can be reduced thereby improving the efficiency of the network 200 by reducing wasted bandwidth. However, designating or selecting relay nodes a priori can be problematic since the dynamic topology of an ad hoc network renders it difficult to guarantee that all nodes will receive a broadcast packet. Thus, improved techniques for designating or selecting a relay node or relay nodes would be desirable.

Figure 3:
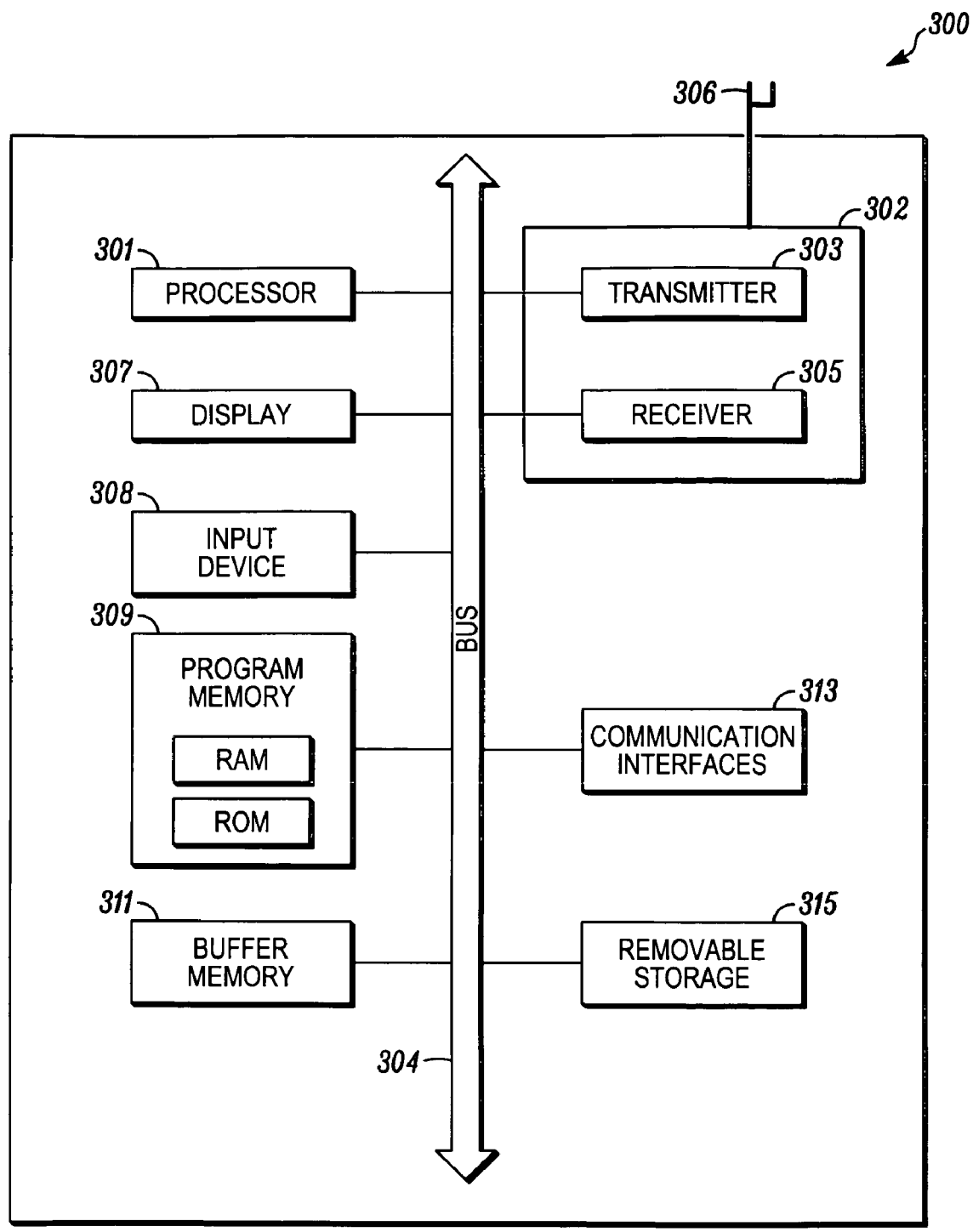
FIG. 3 is a block diagram of an exemplary node in accordance with some embodiments of the invention.

FIG. 3 is a block diagram of an exemplary node 300 in accordance with some embodiments of the invention. The node 300 comprises a processor 301, a transceiver 302 including a transmitter circuitry 303 and a receiver circuitry 305, an antenna 306, a display 307, an input device 308, a program memory 309 for storing operating instructions that are executed by the processor 301, a buffer memory 311, one or more communication interfaces 313, and a removable storage 315. Although not shown, the node 300 also preferably includes an antenna switch, duplexer, circulator, or other highly isolative means (not shown) for intermittently providing information packets from the transmitter circuitry 303 to the antenna 306 and from the antenna 306 to the receiver circuitry 305. The node 300 is preferably an integrated unit containing at least all the elements depicted in FIG. 3, as well as any other elements necessary for the node 300 to perform its particular electronic function. Alternatively, the node 300 may comprise a collection of appropriately interconnected units or devices, wherein such units or devices perform functions that are equivalent to the functions performed by the elements of the node 300. For example, the node 300 may comprise a laptop computer and a wireless LAN (local area network) card.

The processor 301 preferably includes one or more microprocessors, microcontrollers, DSPs (digital signal processors), state machines, logic circuitry, or any other device or devices that process information based on operational or programming instructions. Such operational or programming instructions are preferably stored in the program memory 309. The program memory 309 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 301 has one or more of its functions performed by a state machine or logic circuitry, the memory 309 containing the corresponding operational instructions may be embedded within the state machine or logic circuitry. The operations performed by the processor 301 and the rest of the node 300 are described in detail below.

The transmitter circuitry 303 and the receiver circuitry 305 enable the node 300 to communicate information packets to and acquire information packets from the other nodes. In this regard, the transmitter circuitry 303 and the receiver circuitry 305 include appropriate, conventional circuitry to enable digital or analog transmissions over a wireless communication channel. The transmitter circuitry 303 and the receiver circuitry 305 can operate over an ad hoc networking air interface (e.g., BLUETOOTH, 802.11 WLAN, 802.15.3, 802.16, and the like).

The implementations of the transmitter circuitry 303 and the receiver circuitry 305 depend on the implementation of the node 300. For example, the transmitter circuitry 303 and the receiver circuitry 305 can be implemented as an appropriate wireless modem, or as conventional transmitting and receiving components of two-way wireless communication devices. In the event that the transmitter circuitry 303 and the receiver circuitry 305 are implemented as a wireless modem, the modem can be internal to the node 300 or insertable into the node 300 (e.g., embodied in a wireless RF modem implemented on a Personal Computer Memory Card International Association (PCMCIA) card). For a wireless communication device, the transmitter circuitry 303 and the receiver circuitry 305 are preferably implemented as part of the wireless device hardware and software architecture in accordance with known techniques. One of ordinary skill in the art will recognize that most, if not all, of the functions of the transmitter circuitry 303 and/or the receiver circuitry 305 may be implemented in a processor, such as the processor 301. However, the processor 301, the transmitter circuitry 303, and the receiver circuitry 305 have been artificially partitioned herein to facilitate a better understanding.

The receiver circuitry 305 is capable of receiving RF signals from at least one band and optionally more bands, if the communications with the proximate device are in a frequency band other than that of the network communications. The receiver circuitry 305 may optionally comprise a first receiver and a second receiver, or one receiver capable of receiving in two or more bands. The receiver 305, depending on the mode of operation, may be tuned to receive, for example, Bluetooth or WLAN, such as 802.11, communication signals. The transceiver 302 includes at least one set of transmitter circuitry 303. The at least one transmitter 303 may be capable of transmitting to multiple devices potentially in multiple frequency bands.

The antenna 306 comprises any known or developed structure for radiating and receiving electromagnetic energy in the frequency range containing the wireless carrier frequencies.

The buffer memory 311 may be any form of volatile memory, such as RAM, and is used for temporarily storing received information packets in accordance with the present invention.

When the node 300 is constructed to receive video information from a video source, the node 300 preferably further includes a video decoder capable of decoding the current Moving Picture Experts Group (MPEG) standard or some other video decoding standard. When the node 300 is further capable of transmitting video information, the node 300 preferably further includes a video encoder capable of encoding the video data into at least one of the foregoing video standards. Such video encoder and decoder is preferably implemented as part of the processor 301.

Figure 4:
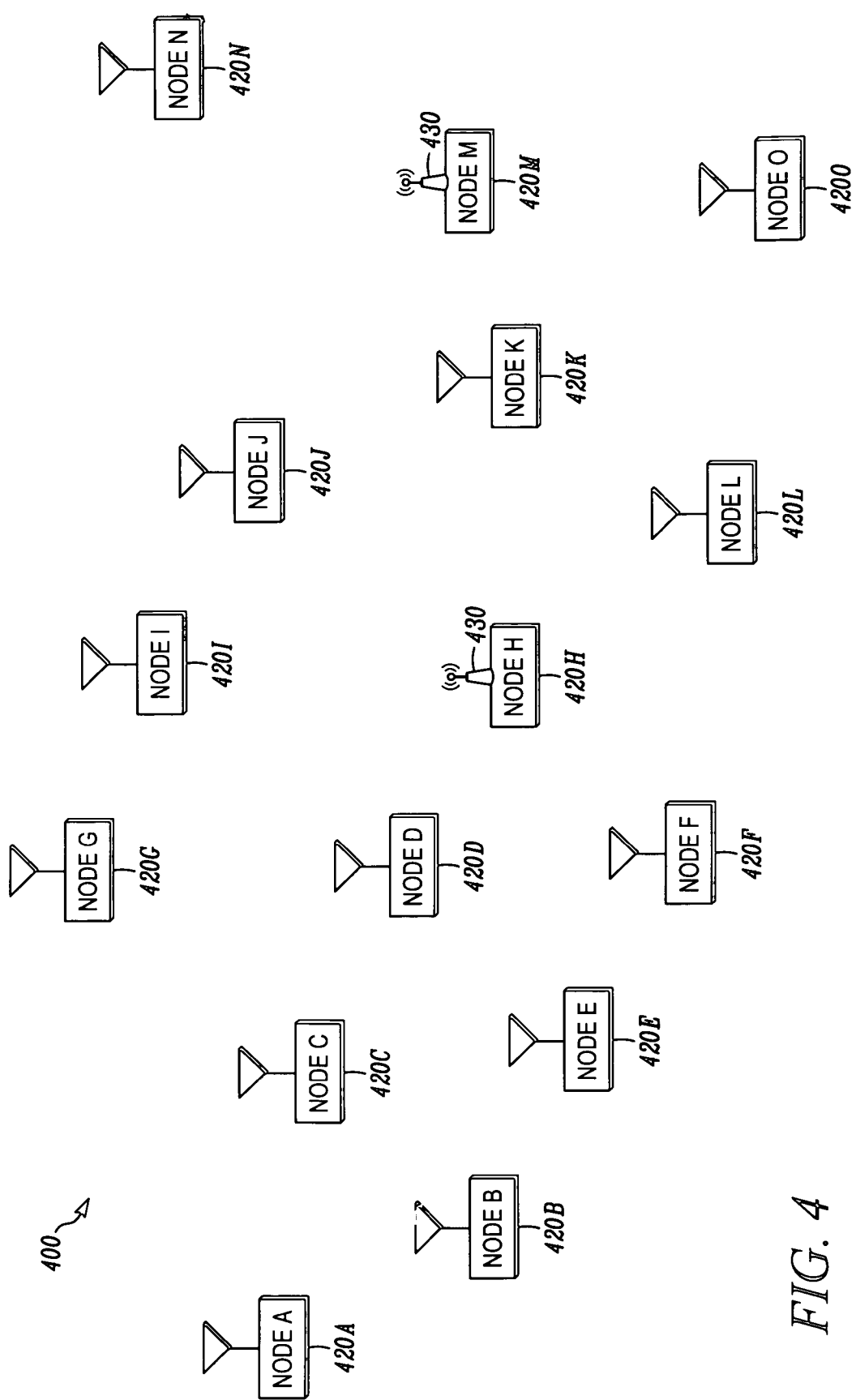
FIG. 4 is a block diagram of an exemplary ad hoc communication network which has yet to select relay nodes.

FIG. 4 is a block diagram of an exemplary ad hoc communication network 400 which has yet to select relay nodes. This ad hoc communication network 400 comprises a plurality of nodes 420A-420O one or more where two of the nodes (420H and 420M) are access points (APs) 430. Nodes in close proximity can receive transmissions from nearby nodes utilizing the ad hoc air interface and relay these transmissions to other nodes, including access points or nodes with links to other wired or wireless networks. In FIG. 4, node A 420A will eventually transmit a broadcast packet or message using a relay approach, however relay nodes have not yet been selected.

Techniques will now be described for electing some of the nodes 420B-420O to serve as a broadcast relay node or nodes (BRNs) that are used to receive and transmit (or "relay") the broadcast packet from Node A 420A throughout the ad hoc network. These techniques can be used to elect BRNs in a manner which can allow broadcast packets to be relayed in an ordered manner in a dynamically changing topology.

Figure 5:
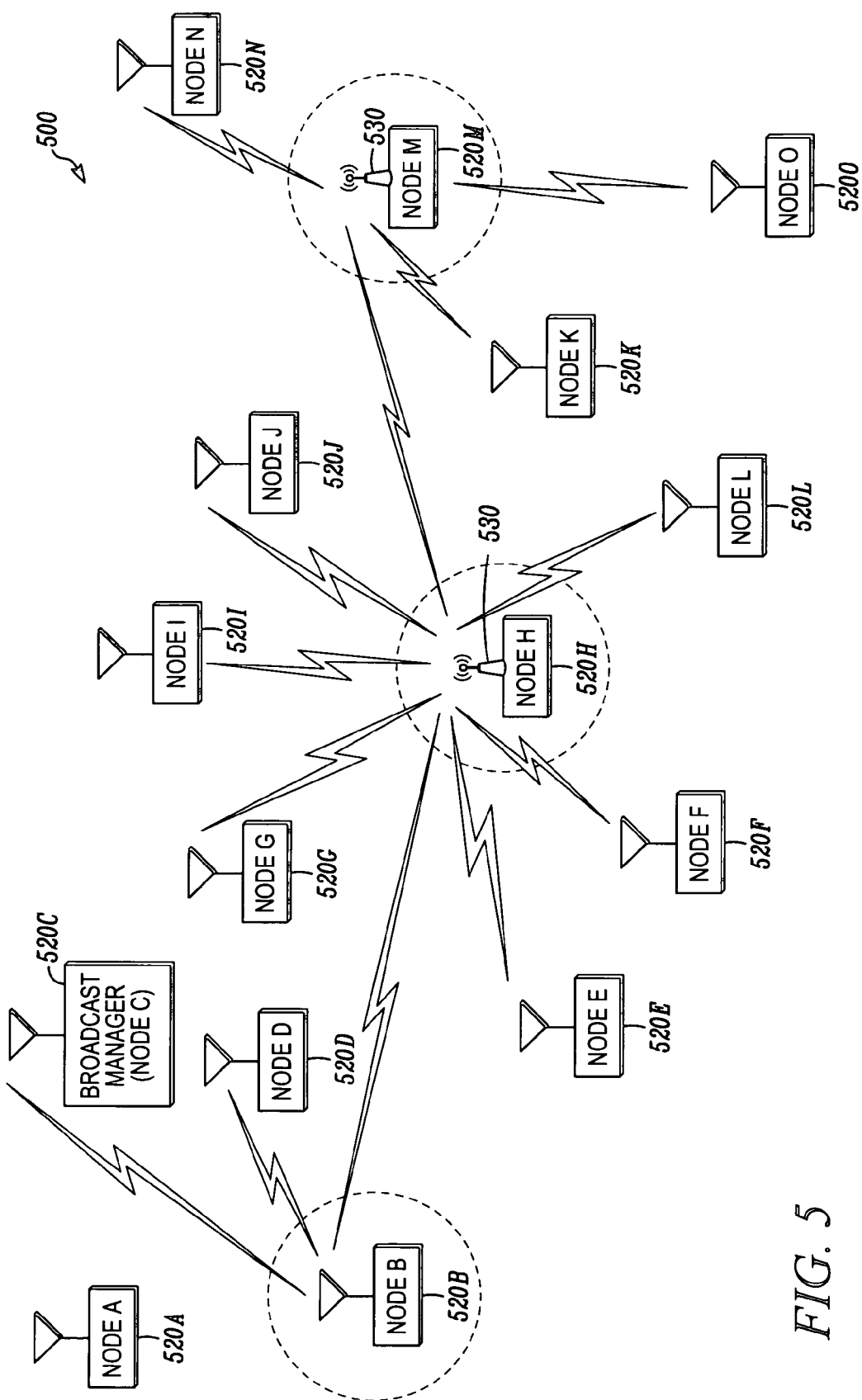
FIG. 5 is a block diagram of the exemplary ad hoc communication network of FIG. 4 after election of relay nodes and which illustrates using a "relay" approach for broadcasting a broadcast packet throughout the network.

FIG. 5 is a block diagram of an exemplary ad hoc communication network 500. Specifically, FIG. 5 illustrates the ad hoc communication network 400 of FIG. 4 after election of relay nodes. FIG. 5 also illustrates using a "relay" approach for broadcasting a broadcast packet throughout the network. To avoid confusion in the following description, the same elements in FIG. 4 and FIG. 5 have been designated with different reference numerals. Specifically, FIG. 4 uses the reference numeral 420 for each node and the reference numeral 430 for each node that is an access point, whereas FIG. 5 uses the reference numeral 520 for each node and the reference numeral 530 for each node that is an access point; however, it should be appreciated that each node in FIG. 4 has a corresponding node in FIG. 5. The example shown in FIG. 5 assumes that a broadcast packet originating at node A 520A is being broadcast to other nodes 520B-520O in the network.

In the example shown in FIG. 5, the techniques described below in FIGS. 6-8 have been used to probabilistically nominate and elect relay nodes based on the parameters for each node. Further, in the example shown in FIG. 5, the nodes marked with a dashed circle (node B 520B, node H 520H, and node M 520M) have been elected as the relay nodes. The relay nodes are responsible for forwarding the broadcast packet from node A 520A to the other nodes 520D, 520E, 520F, 520G, 520H, 520I, 520J, 520K, 520L, 520M, 520N, 520O in the ad hoc network. FIG. 5 also shows that in this example node C 520C has been designated as a broadcast manager node 520C within the ad hoc network 500.

Figure 6:
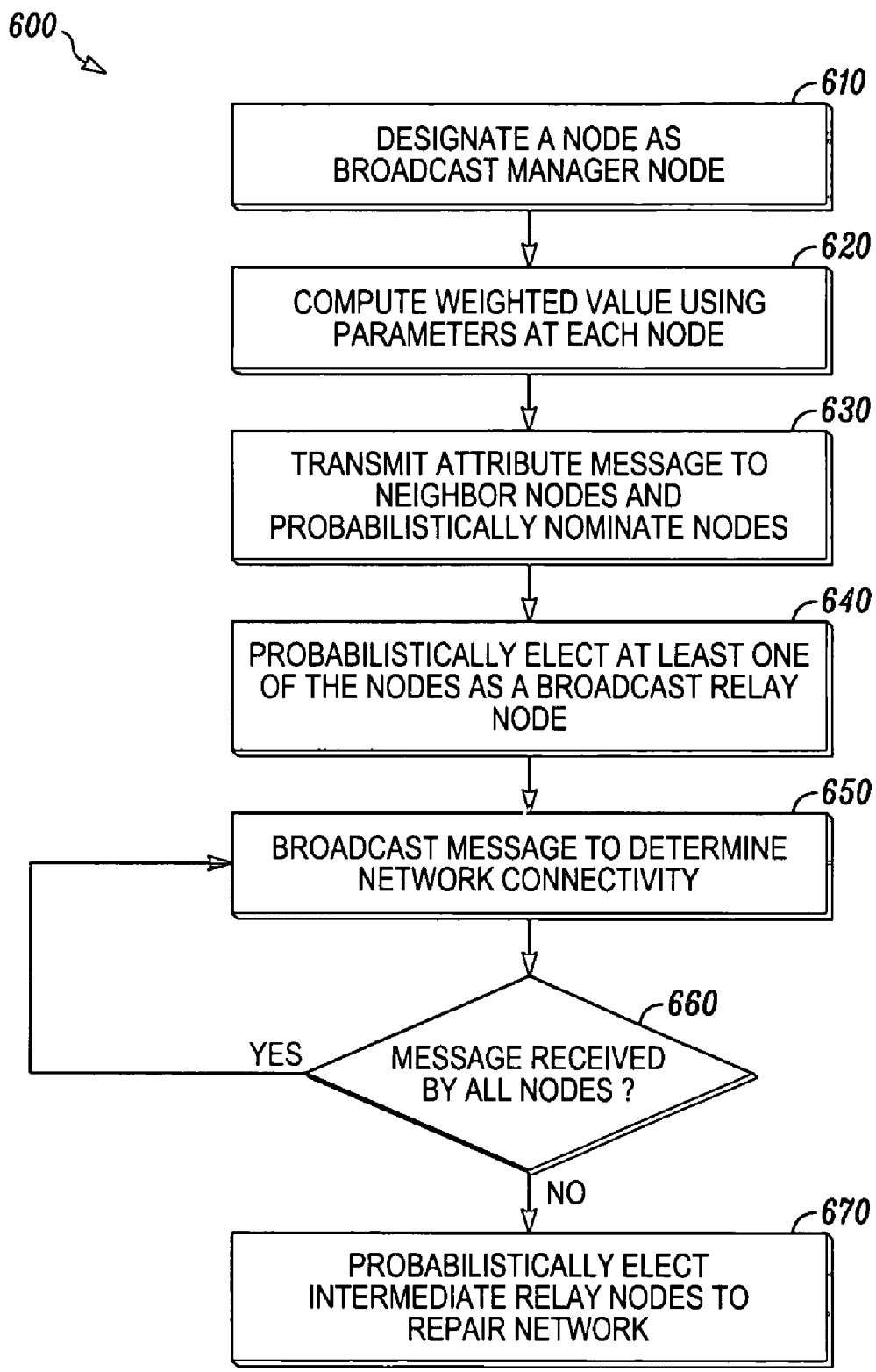
FIG. 6 is a flowchart showing an exemplary method for electing relay nodes and maintaining connectivity in an ad hoc network in accordance with some embodiments of the invention.

FIG. 6 is a flowchart showing an exemplary method 600 for electing relay nodes and maintaining connectivity in an ad hoc network. The method 600 will be described with reference to the exemplary ad hoc network 500 shown in FIG. 5.

After initial deployment (FIG. 4) of the ad hoc network, each node 520A-520O broadcasts a hello packet to its neighbor nodes. Each node 520A-520O uses the hello packet received from their neighbor nodes to build a neighbor list that includes each of the node's neighbors. At step 610, at least one of the nodes is designated as a broadcast manager node (BMN). Ideally, the node selected as the BMN should be a stable node that might have characteristics such as low mobility, an adequate and stable power source (e.g., alternating current (AC) power or highly charged battery), a high number or percentage of communication links with neighbor nodes that are stable, and at least a predetermined number of BRNs within range of the node. However, it should be appreciated that numerous techniques can be used to designate the BMN. For example, in one implementation, the BMN can be randomly selected from all nodes in the network, while in another implementation the BMN can be predesignated prior to or at the time of deployment. The BMN status does not necessarily have to remain with the node that is initially designated as the BMN. For example, after deployment, an election algorithm can be used to dynamically rotate the role of the BMN among nodes. For instance, a token may be passed around and the node holding the token can assume the role of the BMN. A periodic timer or predetermined events may be used to trigger the current BMN to pass its token on to the next BMN.

In the example shown in FIG. 5, it is assumed that node C 520C is initially designated as the BMN. Once designated, the BMN 520C broadcasts a message throughout the ad hoc network 500 indicating that it is currently serving as the BMN. Among other functions, the BMN 520C can communicate with other nodes in the ad hoc network to assist in the nomination and election of the broadcast relay nodes (BRNs). For example, nearby or neighbor nodes can cooperatively elect BRNs or alternatively the BMN 520C can collect nominations for candidate nodes and then help choose or select a backbone network of BRNs for broadcasting broadcast packets throughout the ad hoc network 500.

Each node 520A-520O monitors its status within the ad hoc network 500 and collects status information about its relative status in the ad hoc network 500. The status information can include, for example, parameters such as relative node mobility ($v$), the number of neighbor nodes ($\alpha$) the node has, the average received signal strength (RSS) of transmissions from neighbor nodes ($\beta$), the battery state of the node ($\delta$), the activity level of a node ($\epsilon$) (e.g. serving as a source, destination, or relay in an active session), information as to whether or not the node is actively transmitting over an infrastructured network ($\eta$), location of the node ($\mu$) (e.g., broadcast to only the nodes that are within a given location such as a stadium or if a node is outside the location area it will not rebroadcast), and service type ($\ni$) (e.g., broadcast only if the node has matching Service ID for the services types purchased during the entry), etc.

Each node can also compute or determine a weighted value (WV) for itself based on its parameters. The WV for a given node is a value that can be used to establish the relative priority of a particular node for election or selection as a BRN. As will be described below, the use of a WV can help to simplify the election process.

At step 620, each node 520A-520O computes a WV based on attributes e.g., status information or parameters about the node.

At step 630, each node 520A-520O generates an "attribute" message, and transmits the "attribute" message to other nodes in its vicinity (e.g., its neighbor nodes in the network which are within its range or other nodes in the vicinity of the node which are not on the neighbor list but have come within transmission range of the node). The "attribute" message typically includes at least some of the status information or parameters about the node and may also include its WV. The information contained in the "attribute" message associated with each node 520A-520O is used as input to a distributed algorithm for probabilistically electing broadcast relay nodes in the network.

In one implementation, prior to step 630, at least some (or possibly all) of the nodes can decide to nominate themselves based on a certain parameters (such as selected status information or WV) associated with the node. Then, at step 630, only the nodes which decide to nominate themselves can then transmit an attribute message. Having each node decide whether it should nominate itself before transmitting an attribute message can reduce the number of attribute messages which are transmitted in the ad hoc network.

At step 640, at least one of the nodes is elected as a broadcast relay node (BRN). In one embodiment, where at least one of the nodes is nominated, the BMN 520C communicates with other nodes in the ad hoc network to elect a backbone network of broadcast relay nodes (BRNs). This backbone network can then be used to broadcast packets throughout the ad hoc network 500. The BMN 520C can elect a BRN or BRNs such that the majority of nodes in the ad hoc network is "within range of" or "connected to" at least one BRN while reducing or minimizing the number of BRNs to avoid excessive broadcasts. This election can be made a number of ways as will be described below.

For example, according to one embodiment, each node forwards the attribute message to other nodes in the network until the BMN 520C receives an attribute message from each node in the ad hoc network. In this case, the BMN 520C uses the attribute messages from each node to directly elect BRNs.

According to another embodiment, a two step election process is used. In this embodiment, nodes in a particular group nominate candidate BRNs or "nominee nodes." The nodes in each group (e.g., a node and its neighbor nodes) can then negotiate which node in the group should be selected as a candidate BRN for that group. This can be done, for example, by selecting the node having the highest WV as the candidate BRN for that group. Once the candidate nodes are nominated, the BMN 520C then elects BRNs from the candidate nodes nominated by each group. Again, the BMN 520C can probabilistically elect at least one of the candidate nodes as a relay node based on a comparison of the WVs associated with each candidate node.

In an alternative implementation, step 630 is not performed, and at step 640 at least some (or possibly all) of the nodes can probalistically elect themselves based on a certain parameters (such as selected status information or WV) associated with the node. Such probabilistic self-election avoids the exchange of nomination and an excessive number of nodes elected to be broadcast relay nodes.

In the example shown in FIG. 4, it is assumed that each node has parameters and a weighted value (WV) as shown in Table 1. In the particular example shown in FIG. 5 it is assumed that the BMN 520C elects three nodes (e.g., node B 520B, node H 520H, and node M 520M) as relay nodes at step 640. However, in practical implementations, the number of nodes elected as BRNs will depend on the network configuration at any given time, and an appropriate number of BRNs will be elected such that all nodes (or substantially all nodes) in the ad hoc network will be connected (e.g., one hop away) to at least one of the relay nodes. The other nodes (e.g., nodes other than the relay node(s)) serve as receiver nodes 520C, 520D, 520E, 520G, 520F, 520I, 520J, 520K, 520L, 520N, and 520O such that they do not relay any broadcast packet they receive.

Referring again to FIG. 5, when a node A 520A transmits a packet, each node that receives the packet determines whether the received packet is a broadcast packet. If the received packet is a unicast packet (rather than a broadcast packet), the node transmits the received unicast packet to its appropriate neighbor node toward the intended destination. If the received packet is a broadcast packet, then node determines whether or not the node itself has been elected as a relay node. If the node is not a relay node, the node does not transmit the received packet to any other nodes. However, if the node is one of the relay nodes, then it transmits the received broadcast packet to each of its neighbor nodes. For instance, in FIG. 5 the elected relay node 520B can relay the broadcast packet to its neighbor nodes 520C, 520D, and 520H, relay node 520H can relay the broadcast packet to its neighbor nodes 520E, 520G, 520F, 520I, 520J, 520L, and 520M, and relay node 520M can relay the broadcast packet to its neighbor nodes 520K, 520N, 520O. In comparison to a flooding approach, the number of redundant transmissions can be reduced thereby improving the efficiency of the network 500 by reducing wasted bandwidth.

As noted above, in many cases the topology of the ad hoc network changes significantly over time. As time elapses the initially elected relay nodes (e.g., node B 520B, node H 520H, and node M 520M) may no longer be the most desirable relays. For example, a particular relay node might relocate such that the network becomes fragmented or damaged to the point that some of the nodes in the network lose connectivity and are unable to receive broadcast message(s). Steps 650-670 can provide techniques for determining the connectivity of a network and for electing new relay nodes to repair the network and restore connectivity.

At step 650, the designated broadcast manager node 520C broadcasts a test message to all nodes 520A, 520B and 520D-520O in the network 500 to periodically test the connectivity of nodes in the network 500. This helps ensure the integrity of the backbone network provided by the broadcast relay nodes 520B, 520H, 520M.

At step 660, each node determines whether it received the test message within a predetermined time. In the example of FIG. 5, nodes 520A, 520B and 520D-520O determine whether the test message was received.

In one embodiment, if the test message was received by each of the nodes 520A, 520B and 520D-520O, then the process loops back to step 650 where the broadcast manager node 520C continues to periodically broadcast test messages to the nodes in the network 500.

In an alternative embodiment, if the test message was not received by one of the nodes 520A, 520B and 520D-520O, then at step 670 new intermediate relay nodes can be elected to repair the network 500. Specifically, each node which fails to receive the test message within a predetermined period of time, transmits a message to its neighbor nodes to request election of a broadcast relay node, electing at least one neighbor node that has received the test message within the predetermined period of time as a broadcast relay node, and the elected node sending a broadcast relay status announcement message to its neighbor nodes.

Attribute Message Parameters and Weighted Values (WVs)

As noted above with respect to step 620, each node generates an attribute message.

The attribute message can include a weighted value (WV) determined based on a number of parameters indicative of the node's relative priority for election as a relay node. Each node can use its associated parameters to compute its weighted value (WV) which can then potentially be transmitted in the attribute message. Each node can then evaluate the WVs of each neighbor node to determine a candidate node's desirability as a relay node.

For example, in one implementation, the parameters can include status information about a node. A probability of election can be associated with each parameter. The status information can include, for example:

A) relative node mobility ($\acute{υ}$), where highly mobile nodes are less likely to be elected since they are not stable and cannot be relied on to broadcast messages;

B) the number of neighbor nodes ($\alpha$) the node has (e.g., a node with many neighbors tends to use a lower probability than one with few neighbors since the need for a node that has many neighbors to nominate itself is lower since other neighbor nodes can nominate themselves as the relay node. In other words, a node with very few neighbors nominates itself with high probability, since the need to become a BRN is likely to be high. However, when electing BRNs, a candidate with many neighbors is a better candidate and is therefore more likely to be elected as a BRN.);

C) average received signal strength (RSS) of transmissions from neighbor nodes ($\beta$), where a node with an average RSS falling within a predetermined range of values tends to use a higher probability than a node with an average RSS falling outside the predetermined range of values. If the average RSS is higher than the predetermined range, this indicates that the node is close to its neighbor nodes and therefore the need for it to serve as a relay is low. On the other hand, if the average RSS is lower than the predetermined range, this indicates that the node has unreliable connectivity to its neighbors and therefore the desirability of having it serve as a relay is low;

D) relative battery state of the node ($\delta$), where a node with a low capacity or discharged battery tends to have a lower probability than a device with a high capacity battery or AC line power, E) relative activity level of a node ($\epsilon$) (e.g. serving as a source, destination, or relay in an active session) may be used to adjust the probability of a node electing itself or being elected by other nodes, F) information as to whether or not the node is actively transmitting over an infrastructure-based network ($\eta$), etc. For example, in one embodiment, nodes in close proximity to infrastructure equipment (e.g., nodes N and H in FIG. 4) are more likely to be selected as relay nodes, G) location of the node ($\mu$) (e.g., broadcast to only the nodes that are within a location such as a stadium or if a node is outside the location area it will not rebroadcast.), and H) service type ($\ni$) (e.g., broadcast only if the node has matching Service ID for the services types purchased during the entry), etc.

These parameters can be fed into an algorithm implemented in the processor of each node. This algorithm can determine a weighted value (WV) associated with a particular node. Such an algorithm typically includes scaling factors for each parameter to adjust the relative importance of each parameter in determining the WV. In one embodiment, the WV is a probability measure.

Initial Nomination of Relay Nodes

In one embodiment, relay nodes are initially nominated and subsequently elected. FIG. 7 is a flowchart showing an exemplary method 740 for initially electing relay nodes in an ad hoc network. This method can help ensure the election of the most desirable node(s) as relay node(s).

At step 742, each of the nodes deciding to nominate itself as a relay node candidate can transmit its attribute message to other nodes in the network. In one implementation, each and every node 520A-520O in the ad hoc network can nominate itself as a candidate node by transmitting/broadcasting an attribute message. However, in other implementations, each node can decide whether or not to nominate itself as a relay candidate depending on the relative likelihood of that node being elected as a relay node. In these implementations, only certain nodes decide to transmit/broadcast an attribute message to nominate themselves as candidate relay nodes. For example, each node can decide whether or not to nominate itself by comparing its weighted value to a low threshold ($T_L$) and a high threshold ($T_H$). Thresholds can be used to help reduce the number of nodes which might be considered as candidate nodes. For instance, if a given group includes a large number of nodes (e.g., 100), nodes having a weighted value that falls below a certain low threshold ($T_L$) will automatically be eliminated from the candidate pool. Similarly, nodes having a weighted value which exceeds a high threshold ($T_H$) will always be nominated as a candidate for the relay node selection. This reduces the number of nodes which need to be evaluated and thus simplifies the task of selecting potential candidate nodes. By contrast, if a given group consists of a single node (or a low number of nodes) then all nodes might exceed the high threshold ($T_H$) in which case all nodes might be nominated as candidate nodes.

To illustrate an example of how an election might take place, in the following discussion an example is provided in which a value of $T_H \geq 0.4$ is assumed. As shown in FIG. 4 and Table 1, Node B 420B/520B (WV=0.6), Node C 420C/520C (WV=0.7), Node E 420E/520E (WV=0.5), Node F 420F/520F (WV=0.5), Node H 420H/520H (WV=0.8), Node J 420J/520J (WV=0.4), Node L 420L/520L (WV=0.4), and Node M 420M/520M (WV=0.9), each have a WV which meets or exceeds 0.4 and therefore these nodes are nominated as candidate relay nodes.

Subsequent Election of Relay Nodes

In one embodiment, as described with reference to step 640 of FIG. 6, at least one of the nodes can be nominated as a broadcast relay node (BRN). In some situations only a single BRN will be elected, however, in many situations more than one relay node will be elected. The BMN 520C elects an appropriate number of BRNs such that each node in the ad hoc network is "within range of" or "connected to" at least one BRN. The BMN 520C elects an appropriate number of BRNs such that the number of BRNs is optimized to avoid excessive broadcast traffic and packet collisions. This election can be made in at least one of number of different ways. Two techniques for electing BRNs will now be described with reference to steps 744 and 746 of FIG. 7. In FIG. 7, the dashed line around step 744 is used to indicate that this step is optional.

In one embodiment, step 744 is not performed and the BMN 520C directly elects the BRNs and the nodes do not play a role in the election process. According to this implementation, the method proceeds directly to step 746 from step 742. At step 742, each node deciding to nominate itself as a candidate node forwards its attribute message to other nodes in the network until the BMN 520C receives attribute messages from each candidate node in the ad hoc network 500. In this case, at step 746, the BMN 520C uses the WVs specified in each of the attribute messages to directly elect BRNs. Typically, the BMN 502C selects a minimum number of the candidate node(s) having the highest weighted value(s) as the relay node(s) in a manner which ensures connectivity of all nodes to at least one relay node. In one implementation, the broadcast manager node 520C ranks all of the candidate nodes in order to select relay candidates that will result in the best system performance. Alternatively, the broadcast manager node 520C compares and evaluates selected parameters from the attribute messages from each of nodes, and then selects at least one of the nodes as a relay node.

In a hypothetical example, it can be assumed that the following nodes are nominated as nominee nodes: Node B 420B/520B (WV=0.7), Node C 420C/520C (WV=0.6), Node E 420E/520E (WV=0.5), Node F 420F/520F (WV=0.5), Node H 420H/520H (WV=0.8), Node J 420J/520J (WV=0.4), Node L 420L/520L (WV=0.4), and Node M 420M/520M (WV=0.9). It is further assumed that BMN 520C elects Node B 420B/520B (WV=0.7), Node H 420H/520H (WV=0.8), and Node M 420M/520M (WV=0.9) as the relay nodes In another embodiment, following step 742, both steps 744 and 746 are performed in the election of BRNs. According to this two step election process, both the nodes in a given group and the BMN play a role in deciding which node or nodes should be elected as BRN(s).

At step 744, nodes in a particular group nominate "nominee nodes." The nodes in a given group can regularly share status information with each of the other nodes in their group regarding their ability or inability to act as a relay node. Each node in the group can use this status information or the WVs to nominate at least one of its neighbor nodes to serve as relay nodes. In one embodiment, the nodes in each group (e.g., a node and its neighbor nodes) negotiate which node in the group should be elected as a BRN for that group. This can be accomplished, for example, by electing the node having the highest WV as the BRN for that group. For example, in one implementation, each node compares the WVs for each neighbor node it receives an attribute message from (including its own weighted value), and nominates the node having the highest weighted value as a nominee node for that group. If a number of nodes are nominated as candidates, then the relative priority of each node (e.g., ranking) can also be negotiated among the nodes and specified.

At step 746, once the candidate nodes are nominated, the BMN 520C then elects BRNs from the nominee nodes nominated by each group. The BMN 520C can compare and evaluate parameters for each of the nominee nodes, and then elect at least one of the nominee nodes as BRN(s) based on the relative priority of each node. In one embodiment, the WVs for each node can then be used to establish the relative priority of each nominee node. In one implementation, the BMN 520C can probabilistically elect at least one of the nominee nodes as a relay node based on a comparison of the WVs for each node. As noted above, in many situations more than one relay node will be elected.

In the hypothetical example shown in FIGS. 4 and 5, the WVs computed for each node are as follows: Node B 420B/520B (WV=0.7), Node C 420C/520C (WV=0.6), Node D 420D/520D (WV=0.1), Node E 420E/520E (WV=0.5), Node F 420F/520F (WV=0.5), Node G 420G/520G (WV=0.2), Node H 420H/520H (WV=0.8), Node I 420I/520I (WV=0.3), Node J 420J/520J (WV=0.4), Node K 420K/520K (WV=0.1), Node L 420L/520L (WV=0.4), Node M 420M/520M (WV=0.9), Node N 420N/520N (WV=0.2), and Node O 420O/520O (WV=0.2). In this example, Node A 420A/520A does not compute a WV since it is the node that originates the broadcast packet and therefore can not be selected as a relay node.

The nominee nodes include Node B 420B/520B (WV=0.7), Node E 420E/520E (WV=0.5), Node F 420F/520F (WV=0.5), Node H 420H/520H (WV=0.8), Node J 420J/520J (WV=0.4), Node L 420L/520L (WV=0.4), and Node M 420M/520M (WV=0.9). After evaluating the parameters and/or WVs for each nominee node, the BMN 520C eventually elects nodes 520B, 520H, 520M as the BRNs.

At step 748, the BMN 520C broadcasts a message to nodes 520B, 520H, 520M indicating that those nodes have been elected as the BRNs. At step 749, once elected, each of the initially elected relay node 520B, 520H, 520M sends an announcement message to all its neighbor nodes and confirming its status as a BRN. The announcement message associated with a node includes an indicator indicating that the node is a relay node, and may optionally include an indication of the corresponding group for which the node is a relay node.

In an alternative embodiment, wherein the weighted value is a probability measure, only step 749 in FIG. 7 is implemented. Each node is configured to probabilistically elect itself as a broadcast relay node based on its probability measure by sending an announcement message to its neighbor nodes. Such probabilistic self-election avoids exchange of nomination messages and avoids having an excessive number of nodes elected to be broadcast relay nodes.

The elected relay nodes 520B, 520H, 520M form a backbone network for efficient transmission of broadcast messages so that every node connected to the network can receive a broadcast message. These techniques greatly improve the efficiency of broadcasts since the number of nodes retransmitting a broadcast message can be reduced which in turn decreases excessive retransmissions and/or collisions of broadcast messages Testing and Repairing the Ad Hoc Network Steps 650-670 describe techniques for testing connectivity of the ad hoc network 500 and for repairing disconnects which occur in the ad hoc network 500. A specific example of how these steps can be accomplished will now be described with respect to FIG. 8.

Figure 8:
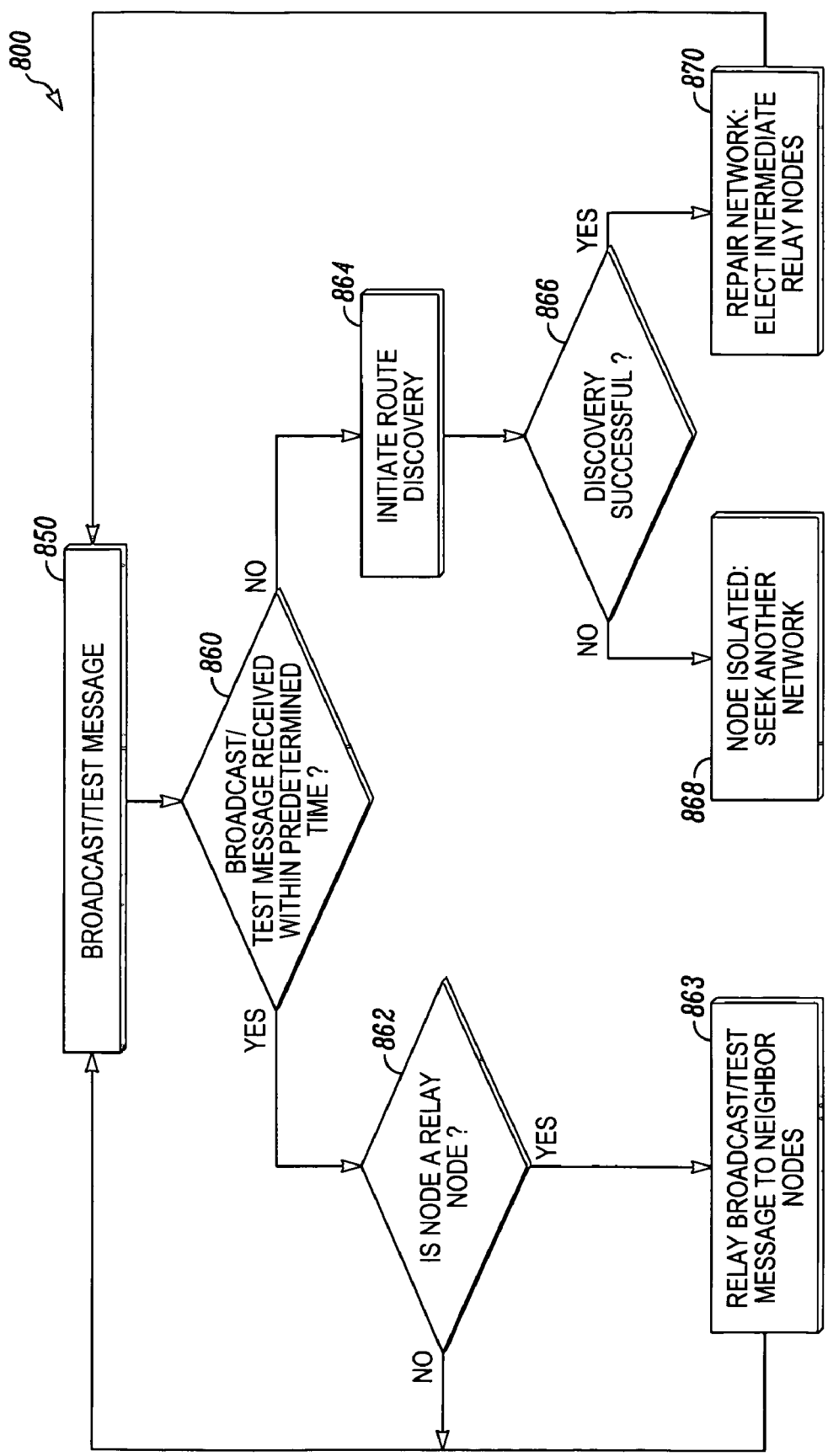
FIG. 8 is a flowchart showing an exemplary method for testing the connectivity of an ad hoc network and repairing the ad hoc network (if repair is appropriate) in accordance with some embodiments of the invention.

FIG. 8 is a flowchart showing an exemplary method 800 for testing the connectivity of an ad hoc network and repairing the ad hoc network if repair is appropriate. This method provides techniques which can help ensure the integrity of the network so that all nodes maintain connectivity and are able to receive the broadcast messages. According to one implementation, test messages and repair procedures are provided to adapt to topology changes.

The connectivity test starts at step 864 when the designated BMN 520C periodically broadcasts a "test" message to test the connectivity among BRNs 520B, 520H, 520M. When broadcast traffic is common in the network, the "test" message can be any broadcast message transmitted among the nodes. Each node will monitor a channel for the test message. However, if broadcast traffic is infrequent in the network and the BMN 520C does not receive a broadcast message for a certain amount of time as determined by a timer in the BMN 520C, the BMN 520C can periodically generate a dedicated test message for testing network connectivity. Thus, if there is sufficient or frequent broadcast traffic in the network, then dedicated test messages will not be generated and regular broadcast messages can be used in lieu of dedicated test messages.

In either case, only the BRNs 520B, 520H, 520M rebroadcast the test message. In some implementations, the test message can also include an announcement of the next node to receive a token designating a new BMN.

At step 866, each node monitors a channel for the test message, and periodically determines whether or not a test message has been received. If the node determines that a test message has been received, then the process proceeds to step 862, where the node determines whether it is one of the initially elected BRNs 520B, 520H, 520M. If the node is not one of the initially elected BRNs 520B, 520H, 520M, then at step 863 the process loops back to step 864 where the node continues to monitor the channel for the test message. If the node is one of the initially elected BRNs 520B, 520H, 520M, then at step 863 the node relays the test message to its neighbor nodes, before looping back to step 864 where the node continues to monitor the channel for the test message.

If a node fails to receive a test message within a predetermined time, this indicates that the backbone network of BRNs 520B, 520H, 520M is insufficient and that additional BRNs should be elected to repair the backbone. Typically a node that fails to receive a test message is out of range of a BRN and is therefore unable to receive a test message. In one embodiment, if the node determines that a test message has not been received at step 866, then the process proceeds to step 864. At step 864, any node that fails to receive a test message then initiates route discovery to try to discover a BRN 520B, 520H, 520M. Other neighbors of this node may be within range of a BRN. The node can communicate with its neighbor nodes to attempt to discover a route to a BRN using one of several known techniques. Examples of common route discovery techniques for discovering communication routes to other nodes in the network can include, for example, an Ad hoc on Demand Distance Vector (AODV) route discovery technique, Dynamic Source Routing (DSR) route discovery technique such as that disclosed in Johnson et al., "Dynamic Source Routing in Ad hoc Wireless Networks", Mobile Computing, 1996, a Temporally Ordered Routing Algorithm (TORA) route discovery technique, Destination-Sequenced Distance Vector (DSDV) route discovery technique such as that disclosed in U.S. Pat. No. 5,412,654 to Perkins, and a Zone Routing Protocol (ZRP) route discovery technique such as that disclosed in U.S. Pat. No. 6,304,556 to Haas.

According to one technique, the node that fails to receive a test message initiates the route discovery process by broadcasting a route request packet that includes the address of the source and the destination (e.g., one of the BRNs 520B, 520H, 520M), and a unique identification number. The route request packet is sent through intermediate nodes on several different paths. Each intermediate node determines if it knows of a route to one of the BRNs 520B, 520H, 520M. If it does not, it appends its address to the route record of the packet and forwards the packet to its neighbor nodes. To limit the number of route requests propagated, a node processes the route request packet only if it has not already received the packet and its address is not present in the route record of the packet. A route reply is generated when either one of the BRNs 520B, 520H, 520M or an intermediate node with current information about one of the BRNs 520B, 520H, 520M receives the route request packet. A route request packet reaching such a node already contains, in its route record, the sequence of hops taken from the node that fails to receive a test message to this node. As the route request packet propagates through the network, a route record is formed. If the route reply is generated by one of the BRNs 520B, 520H, 520M, then it places the route record from the route request packet into the route reply packet. On the other hand, if the node generating the route reply is an intermediate node, then it appends its cached route to one of the BRNs 520B, 520H, 520M to the route record of the route request packet and puts that into the route reply packet. To send the route reply packet, the responding node must have a route to the node that failed to receive a test message and initiated the route discovery. If it has a route to the node that fails to receive a test message in its route cache, it can use that route.

At step 866 it is determined whether route discovery is successful. If route discovery is successful (e.g., a BRN 520B, 520H, 520M is found), then at step 870, the node determines intermediate nodes which can connect the node to the relay node. The node then nominates the intermediate nodes and additional BRNs 520B, 520H, 520M are elected to repair the backbone network.

If a path to one of the BRNs 520B, 520H, 520M cannot be found, then at step 868, it is determined that the node is an isolated node and is no longer part of the original ad hoc network 500. The isolated node may continue attempts to rejoin the original network, join another network, or form a new network. This can be accomplished using an appropriate route discovery technique such as those described above. In the event the node decides to create a new network with other nodes, this process can take place as described above.

In an alternative embodiment, each node which fails to receive the test message within a predetermined period of time, transmits a message to its neighbor nodes to request election of a broadcast relay node, electing at least one neighbor node that has received the test message within the predetermined period of time as a broadcast relay node, and the elected node sending a broadcast relay status announcement message to its neighbor nodes.

Renouncement of BMN and BRN Status

To allow adaptation to topology changes and to continuously optimize the network, the BMN 520C and the elected BRNs 520B, 520H, 520M can periodically or probabilistically renounce their status as BMN/BRNs. In one implementation, to ensure fairness, the BMN 520C and each BRN 520B, 520H, 520M can periodically renounce its BRN status after a predetermined period of time by announcing expiration of its BMN/BRN status to neighbor nodes. In yet another implementation, the BMN 520C and each BRN 520B, 520H, 520M may probabilistically renounce its BMN/BRN status based on its WV, parameters in its attribute message and/or if it was nominated by another node to repair the backbone network. For example, a BRN might decide to renounce its BRN status if at least a predetermined number of its neighbor nodes have announced themselves to be active BRNs. For another example, a BMN might decide to renounce its BMN status if it is becoming unstable due to increasing speed of its movement. Once renounced, another node can be elected to assume the role of the BMN.

In the foregoing specification, specific embodiments of the present invention have been described. However, one of ordinary skill in the art appreciates that various modifications and changes can be made without departing from the scope of the present invention as set forth in the claims below. For example, while the description above describes election of broadcast relay nodes (BRNs), testing connectivity and repairing of an ad hoc network, it should be appreciated that these broadcast concepts can also be applied to multicast groups as well, where a subset of the nodes in the ad hoc network belongs to a multicast group. In such cases, the techniques described above could be used to elect multicast relay nodes (MRNs) for distributing multicast messages (MCMs). The elected MRNs can be a subset of the elected BRNs. When there are multiple multicast groups, then only the MRN for a particular group will relay a multicast message for that particular group. Alternatively, each particular multicast group can elect its own independent set of MRNs with preference given to nodes that are members of that particular multicast group. Thus, a node that is a member of a given multicast group will tend to use a higher probability to elect itself as a MRN for that particular group, and a relay node that is not a member of that particular multicast group would be more likely to renounce its MRN status by utilizing a shorter predetermined period of time or a higher probability for renouncement. In addition, service types may be used as a basis for establishing multicast groups, so that the MRNs are more likely to relay messages for their own service type. Since different service types may have different resource requirements, this helps ensure that MRNs are well matched to their service type and that the MRNs of one service type will not be burdened with relaying the multicast messages of another service type.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. An ad hoc network, comprising:
   a plurality of nodes,
   wherein each node is configured to generate an attribute message comprising parameters associated with that node, and to transmit the attribute message; and
   a broadcast manager node configured to receive the attribute messages from each node and to elect at least one of said nodes as a broadcast relay node based on the attribute messages,
   wherein each node is configured to generate a weighted value based on the parameters associated with that node, the weighted value provides a metric for ranking that node as a candidate for election as a broadcast relay node, and the attribute message transmitted from each node further comprises the weighted value associated with each particular node, and
   wherein at least one of:
   a) each node is configured to nominate at least one nominee node for election as a broadcast relay node, and the broadcast manager node is configured to rank each nominee node based on the weighted values associated with the nominee nodes to determine candidate nodes, and to elect at least one of the candidate nodes as the broadcast relay node, or
   b) the weighted value is a probability measure, and each node is configured to probabilistically elect itself as a broadcast relay node based on its probability measure by sending an announcement message to its neighbor nodes.

2. The ad hoc network of claim 1, wherein each of said nodes has at least one neighbor node, and wherein the parameters associated with each particular node comprise at least one of:
   a number of neighbor nodes of the particular node,
   a received signal strength from each of the neighbor nodes to the particular node,
   a battery state of the particular node,
   an activity level of the particular node,
   a mobility of the particular node,
   an indicator as to whether the particular node is in communication with an infrastructure entity,
   location of the particular node, and
   service types associated with the particular node.

3. The ad hoc network of claim 1, wherein the broadcast manager node is configured to rank each node based on the weighted values to determine candidate nodes, and to elect at least one of the candidate nodes as the broadcast relay node.

4. The ad hoc network of claim 1, wherein the broadcast manager node is configured to periodically broadcast a test message to ensure that a broadcast message is transmitted within a predetermined time, and wherein each node is configured to determine if the test message is received within a predetermined time and, when the node is a broadcast relay node, relay the test message to neighbor nodes of that node.

5. The ad hoc network of claim 4, wherein each node which fails to receive the test message within a predetermined period of time, transmits a message to its neighbor nodes to request election of a broadcast relay node, electing at least one neighbor node that has received the test message within the predetermined period of time as a broadcast relay node, and the elected node sending a broadcast relay status announcement message to its neighbor nodes.

6. The ad hoc network of claim 5, wherein each broadcast relay node probabilistically renounces its broadcast relay status by sending a renouncement message to its neighbor nodes if at least a predetermined number of its neighbor nodes announce themselves to be broadcast relay nodes.

7. An ad hoc network, comprising:
a plurality of nodes, each node configured to generate an attribute message comprising parameters associated with that node and to transmit the attribute message; and
a broadcast manager node configured to receive the attribute messages from each node and to elect at least one of said nodes as a broadcast relay node based on the attribute messages,
wherein the broadcast manager node is configured to periodically broadcast a test message to ensure that a broadcast message is transmitted within a predetermined time, and
wherein each node is configured to determine if the test message is received within a predetermined time and, when the node is a broadcast relay node, relay the test message to neighbor nodes of that node.

8. The ad hoc network of claim 7, wherein each node is configured to initiate election of at least one of the nodes as an intermediate broadcast relay node when that node fails to receive the message within the predetermined time.

9. The ad hoc network of claim 8, wherein each node is configured to initiate route discovery to attempt to discover a route from that node to at least one of the broadcast manager node or one of the elected broadcast relay nodes when the message is not received at that node.

10. The ad hoc network of claim 9, wherein the broadcast manager node is configured to elect at least one of the nodes as an intermediate broadcast relay node when a route is discovered from the node, that failed to receive the message within the predetermined time, to at least one of the broadcast manager node or one of the elected broadcast relay nodes,
wherein the intermediate broadcast relay node completes a communication link from the node, that failed to receive the message within the predetermined time, to at least one of the broadcast manager node or one of the elected broadcast relay nodes.

11. The ad hoc network of claim 7, wherein each of said nodes has at least one neighbor node, and wherein the parameters associated with each particular node comprise at least one of:
a number of neighbor nodes of the particular node,
a received signal strength from each of the neighbor nodes to the particular node,
a battery state of the particular node,
an activity level of the particular node,
a mobility of the particular node,
an indicator as to whether the particular node is in communication with an infrastructure entity,
location of the particular node, and
service types associated with the particular node.

12. In an ad hoc network comprising a plurality of nodes, a method comprising:
generating an attribute message at each node, wherein each attribute message comprises parameters associated with each particular node;
transmitting the attribute message from each node to neighbor nodes;
electing at least one of said nodes as a broadcast relay node based on the attribute messages; and
generating a weighted value for each node based on the parameters associated with each node,
wherein the weighted value provides a metric for ranking the node as a candidate for election as a broadcast relay node and the attribute message transmitted from each node further comprises the weighted value associated that node,
and at least one of:
a) the weighted value is a probability measure, and each node is configured to probabilistically elect itself as a broadcast relay node based on its probability measure by sending an announcement message to its neighbor nodes,
b) electing at least one of said nodes as a broadcast relay node comprises:
nominating, at each node, at least one nominee node for election as a broadcast relay node;
ranking each nominee node based on the weighted values associated with the nominee nodes to determine candidate nodes; and
electing at least one of the candidate nodes as the broadcast relay node, or
c) the plurality of nodes are divided into first and second multicast groups, and electing at least one of said nodes as a broadcast relay node comprises:
nominating, at each node in the first multicast group, nominee nodes for election as a broadcast relay node for the first multicast group;
ranking each nominee node based on the weighted values associated with the nominee nodes to determine candidate nodes for the first multicast group; and
electing at least one of the candidate nodes as the broadcast relay node for the first multicast group.

13. The method of claim 12, wherein each of said nodes has at least one neighbor node, and wherein the parameters associated with each node comprise at least one of:
a number of neighbor nodes of the node,
a received signal strength from each of the neighbor nodes to the node,
a battery state of the node, an activity level of the node,
a mobility of the node and an indicator as to whether the node is in communication with a wired infrastructure entity,
location of the particular node, and
service types associated with the particular node.

14. The method of claim 12, wherein electing at least one of said nodes as a broadcast relay node, comprises:
ranking each node based on the weighted values to determine candidate nodes; and
electing at least one of the candidate nodes as the broadcast relay node.

15. The method of claim 12, wherein the plurality of nodes are divided into a first multicast group and a second multicast group, and wherein electing at least one of said nodes as a broadcast relay node, comprises:
ranking each node based on the weighted values to determine candidate nodes for the first multicast group; and electing at least one of the candidate nodes as the broadcast relay node for the first multicast group.

16. The method of claim 12, wherein the ad hoc network further comprises a broadcast manager node, and further comprising:
periodically broadcasting a test message from the broadcast manager node to ensure that a broadcast message is transmitted within a predetermined time;
determining, at each node if the test message is received within a predetermined time; and
relaying the test message to neighbor nodes, when the node is a broadcast relay node; and
transmitting a message to its neighbor nodes to request election of a broadcast relay node from each node which fails to receive the test message within a predetermined period of time, electing at least one neighbor node that has received the test message within the predetermined period of time as a broadcast relay node, and the elected node sending a broadcast relay status announcement message to its neighbor nodes.

17. The method of claim 16, wherein each broadcast relay node probabilistically renounces its broadcast relay status by sending a renouncement message to its neighbor nodes if at least a predetermined number of its neighbor nodes announce themselves to be broadcast relay nodes.

18. In an ad hoc network comprising a plurality of nodes including a first node, a method comprising:
generating an attribute message at each node, wherein each attribute message comprises parameters associated with each particular node;
transmitting the attribute message from each node to neighbor nodes;
electing at least one of said nodes as a broadcast relay node based on the attribute messages; and
at least one of:
(a) periodically broadcasting a test message from a broadcast manager node to ensure that a broadcast message is transmitted within a predetermined time;
determining if the first node received the test message; and
electing at least one of the nodes as an intermediate broadcast relay node to restore network connectivity to the first node when the first node did not receive the test message, or b) wherein the plurality of nodes each have at least one service type associated therewith, and wherein electing at least one of said nodes as a broadcast relay node, comprises:
grouping the nodes into groups based on service types;
determining candidate nodes belonging to a group associated with a first service; and
electing at least one of the candidate nodes as the broadcast relay node for the group associated with a first service.

19. The method of claim 18, wherein electing at least one of the nodes as an intermediate broadcast relay node, comprises:
attempting to discover a route from the first node to at least one of the broadcast manager node or one of the elected broadcast relay nodes when the test message is not received at the first node; and
when a route is discovered from the first node to at least one of the broadcast manager node or one of the elected broadcast relay nodes, electing at least one of the nodes as an intermediate broadcast relay node which completes a communication link from the first node to at least one of the broadcast manager node or one of the elected broadcast relay nodes.

20. The method of claim 18, further comprising:
determining if the first node is a broadcast relay node upon receipt to the test message; and
relaying the test message to neighbor nodes of the first node when the first node is determined to be a broadcast relay node.

21. The method of claim 18, wherein each of said nodes has at least one neighbor node, and wherein the parameters associated with each particular node comprise at least one of:
a number of neighbor nodes of the particular node,
a received signal strength from each of the neighbor nodes to the particular node,
a battery state of the particular node,
an activity level of the particular node,
a mobility of the particular node,
an indicator as to whether the particular node is in communication with an infrastructure entity,
location of the particular node, and
service types associated with the particular node.

* * * * *